Patented July 10, 1923.

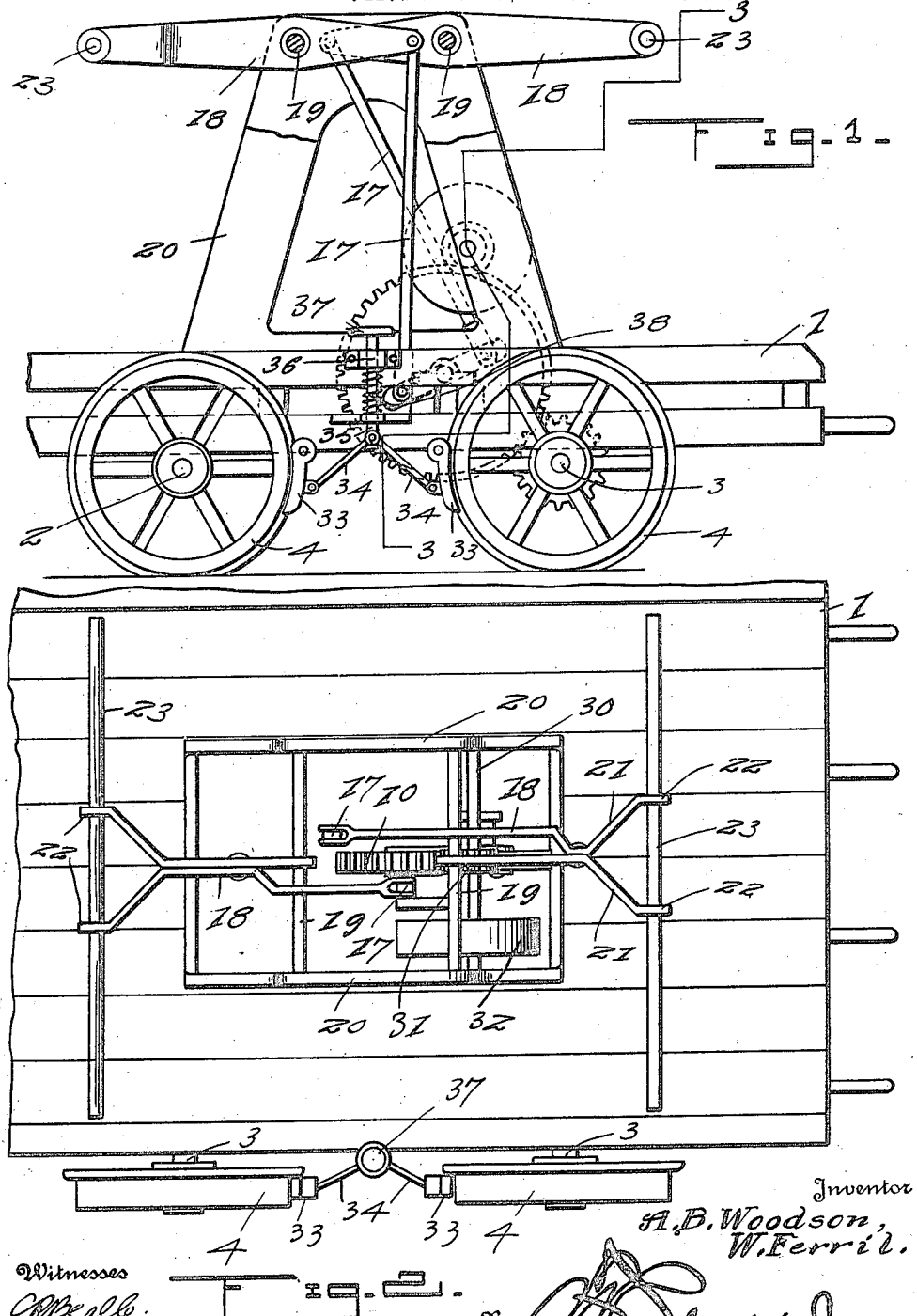

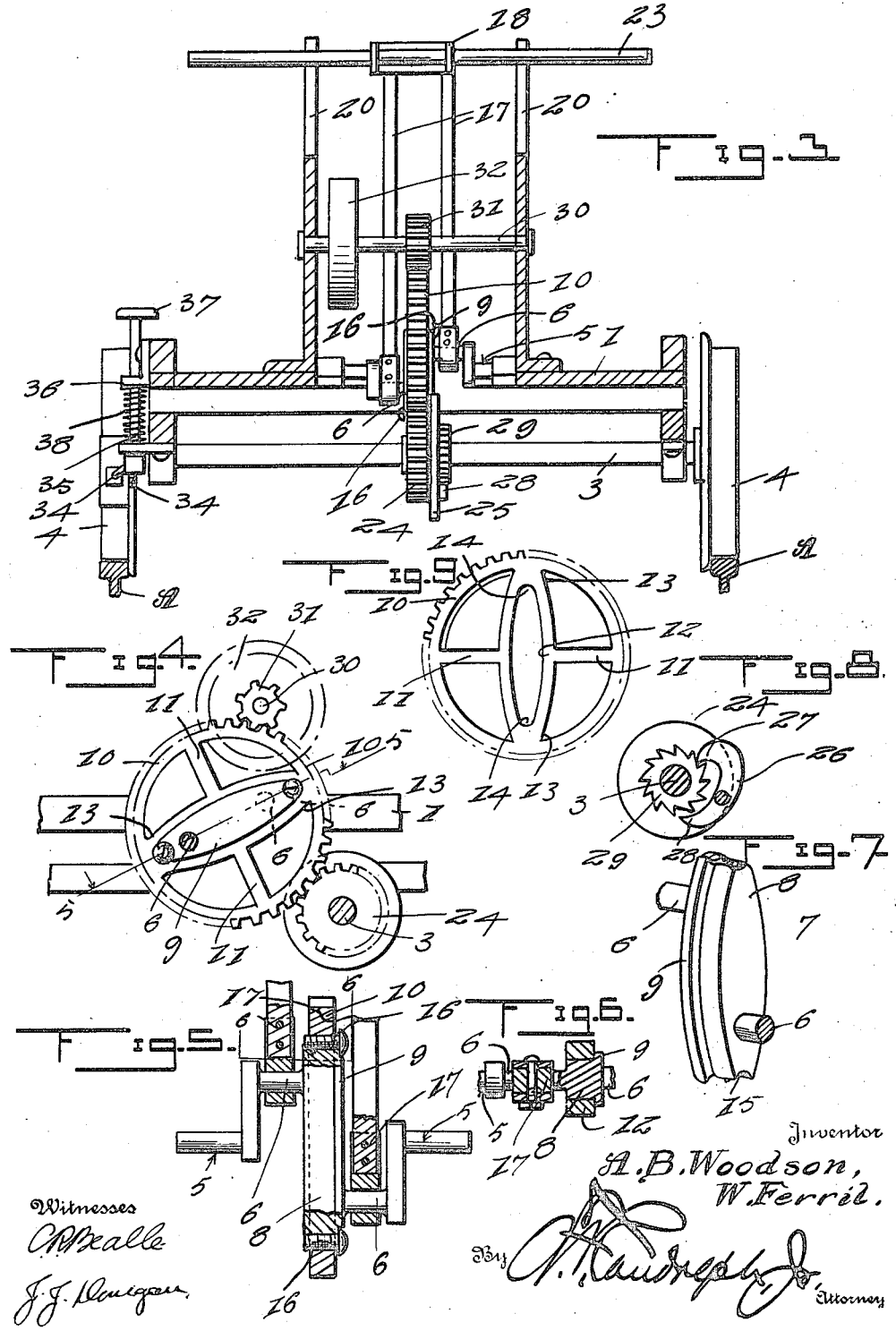

1,461,593

UNITED STATES PATENT OFFICE.

ALLEN B. WOODSON AND WARHAM FERRIL, OF CLARKSVILLE, TENNESSEE; SAID WOODSON ASSIGNOR TO SAID FERRIL.

HAND CAR.

Application filed November 11, 1922. Serial No. 600,305.

*To all whom it may concern:*

Be it known that we, ALLEN B. WOODSON and WARHAM FERRIL, citizens of the United States, residing at Clarksville, in the county of Montgomery and State of Tennessee, have invented certain new and useful Improvements in Hand Cars; and we do hereby declare the following to be a full, clear, and exact description of the invention, such as will enable others skilled in the art to which it appertains to make and use the same.

This invention relates to improvements in hand cars, and particularly the operating mechanism therefor; and the primary object of the invention is the provision of operating mechanism which consists of a small number of parts which are arranged in a novel, compact and convenient manner, so as to occupy a small amount of space.

Another object of the invention is the provision of operating mechanism, of this character, including a driving gear and a crank shaft which are associated with each other in a novel and effective manner.

Other objects will appear and be better understood from that embodiment of our invention of which the following is a specification, reference being had to the accompanying drawings forming a part thereof, in which:

Figure 1 is a side elevation of the hand car, partially in section, and showing the improved operating mechanism associated therewith, Figure 2 is a top plan view of the hand car, Figure 3 is a section taken on the line 3—3 of Figure 1, Figure 4 is a side view of the driving gear and the crank shaft, showing the gear in mesh with a gear on the axle of the hand car, Figure 5 is a section taken on the line 5—5 of Figure 4.

Figure 6 is a section on the line 6—6 of Figure 5,

Figure 7 is a detail view of the crank shaft, detached from the driving gear,

Figure 8 is a detail showing the type of clutch employed for locking the axle to the gear thereon, so as to effect rotation of the axle when the driving gear is operated, Figure 9 is a side view of the driving gear detached from operative position.

Referring to the drawings in detail, the hand car is shown consisting of a platform 1, mounted upon a suitable frame, and journaled in brackets on the under side of the frame is a front axle 2 and a rear or drive axle 3, the said axles having mounted thereon flanged wheels 4 for travel on the rails of a track, designated A. The platform 1 is provided, centrally, with an opening, and journaled in suitable bearings on opposite sides of the opening are the ends of the crank shaft, designated 5. The crank shaft 5 is provided with a pair of opposed crank portions 6, which are adapted to rotate within the opening in the platform 1. The crank portions 6 of the crank shaft 5 have connection with each other by means of an elliptical shaped key or head 8, which has one side thereof provided with a flange 9. Rotatably positioned within the opening in the platform 1 is a driving gear 10, which peripherally projects above and below the platform 1. The gear wheel is provided with relatively long opposed spokes 11, which have connection with the rim of the wheel and the sides of an elliptical shaped hub 12, and a pair of relatively short spokes 13 connected to the rim and the apices or ends of the hub 12. The key or head 8 detachably fits within the opening in the hub 12, as shown in Figure 5, and the flange 9 on the key 8 engages the side of the hub 12, so as to limit the movement of the key or head 8 within the opening in the hub 12. The end walls of the opening in the hub 12 are threaded, as shown at 14, which threaded walls or extremities of the opening register with recesses 15 in the extremities of the key or head 8, the walls of the recesses 15 being threaded, and fastening elements 16 have threaded shanks which are threadedly received by the opposed threaded portions 14 and recesses 15, so as to retain the head or key 8 within the opening in the hub 12, as shown in Figure 5 of the drawings.

Vertically disposed links 17 extend through the opening in the platform, and have their lower ends connected, respectively, in any suitable manner, to the respective crank portions 6 of the crank shaft 5. The upper ends of the levers 17 have connection with the inner ends of levers 18. Each of the levers 18 is formed of a pair of elongated plates, the said levers 18 being mounted for rocking movement on shafts 19, which are mounted in a suitable supporting frame consisting of opposed vertical uprights 20. The plates forming each lever have their outer ends arranged in outwardly diverging relation, as shown at 21, and then terminally bent in parallelism, as shown at 22, and a handle 23 extends through the parallel portions 22 on each lever, so as to admit of the levers being conveniently operated. When the levers 18 are given a rocking movement, the links 17 will be reciprocated and effect rotation of the crank shaft 5, resulting in rotation of the driving gear 10.

Mounted on the driving or rear axle 3 of the hand car is a relatively small gear wheel 24, which is adapted to have rotation on the axle 3, and has one side provided with a circular flange 25, upon which is pivotally mounted a pawl 26, which has its opposite ends pointed and bent into opposed relation, as shown at 27 and 28 in Figure 8 of the drawings. Keyed to the rear or drive axle 3 is a ratchet wheel 29, which is located adjacent the collar 25 on the gear 24, and is adapted to have the teeth thereon engaged by the ends 27 and 28 of the pawl 26. When the gear wheel 10 is rotated in one direction, resulting in the rotation of the gear 24, the ends 27 and 28 of the pawl 26 will lock with the adjacent teeth of the ratchet 29, and effect rotation of the axle 3, resulting in the wheels 4, carried by the axle 3, being rotated and effecting movement of the car along the rails of the track A. During the running of the car down grade, the levers 18 can be held stationary, thus stopping rotation of the gears 10 and 24, and permitting the axle 3 to rotate under its own momentum, causing the teeth of the ratchet 29 to travel past the ends 27 and 28 of the pawl 26. A shaft 30 is journaled in the opposed uprights 20, at a point above the gear 10, and is provided with a relatively small gear 31, which meshes with the gear 10, so that during the rotation of the gear 10 rotation will be imparted to the shaft 30. A fly wheel 32 is mounted on the shaft 30, and is adapted to rotate therewith, so that a smooth motion will be imparted to the hand car during travel of the same.

One side of the car body has a pair of brake shoes 33 pivoted thereon and opposing the peripheries of the adjacent wheels 4, the said shoes having pivotal connection with the lower ends of downwardly diverging links 34, which have their upper ends pivoted to a vertically reciprocating rod 35, which extends upwardly through cap sleeve bearing members 36, the upper end of the shaft 35 projecting above the platform and provided with a head 37. When the shaft 35 is depressed the links 34 will effect movement of the shoes 33 into engagement with the peripheries of the adjacent wheels 4 and effect stopping of the car, when the latter is in motion. An expansive helical spring 38 surrounds the shaft 35 and is interposed between the bearing members 36, and is adapted to return the shaft 35 to normal position after the same has been released from depressed position.

It is evident that various changes might be resorted to in the construction, form and arrangement of the several parts without departing from the spirit and scope of the invention as claimed.

Having thus described our invention what we claim as new, is:

1. In a hand car, the combination with a platform having an opening therein and a driving axle disposed below the platform, of a crank shaft journaled on the platform and extending across the opening, manipulating elements operatively connected to the crank shaft, a gear carried by the crank shaft and rotatable within the opening in the platform and adapted to have rotation when the crank shaft is rotated, a gear loosely mounted on the driving axle and meshing with the first-mentioned gear and adapted to have rotation when the first-mentioned gear is rotated, and means for locking the second-mentioned gear to the driving axle when the said gear is rotated in one direction, so as to effect rotation of the driving axle.

2. In a hand car, the combination with a platform having an opening therein, and an axle disposed below and operatively connected with the platform and having a gear thereon, of a crank shaft journaled over the opening in the platform, an elliptical shaped head carried by the crank shaft, a gear wheel located within the opening and having an elliptical shaped hub for receiving the head on the crank shaft, means for detachably connecting the hub of the gear wheel to the head on the crank shaft, said gear wheel meshing with the gear on the axle, and manipulating elements connected to the crank shaft.

3. A hand car including a driving axle including a platform having an opening therein, a driving axle disposed below the platform and operatively connected thereto, a crank shaft extending across the opening in the platform and having an elliptical shaped head thereon having the extremities thereof provided with recesses having threaded walls, a gear wheel mounted within the opening in the platform and having an elliptical shaped hub for receiving the head on the crank shaft, the said integral shaped hub having the extremities of the opening therein threaded and opposing the recesses in the head, and fastening elements having threaded shanks received by the opposing recesses and extremities in the respective head and opening in the hub for securing the gear wheel on the head, and a gear carried by the axle and meshing with the gear on the head.

4. A hand car including a platform, a driving axle disposed below the platform and operatively connected thereto, a gear on the axle, a crank shaft journaled on the platform, a gear carried by the crank shaft and meshing with the gear on the driving axle, manipulating elements operatively connected to the crank shaft, uprights supported on the platform, a shaft journaled between the uprights, a gear carried by the last-mentioned shaft and meshing with the gear on the crank shaft, and a fly wheel carried by the shaft and journaled between the uprights, for the purpose specified.

In testimony whereof we affix our signatures in presence of two witnesses.

ALLEN B. WOODSON.
WARHAM FERRIL.

Witnesses:
VIRGIE SMITH,
W. E. CRATZER.